May 30, 1944. A. P. FALL 2,349,903
PISTON RING ASSEMBLY
Filed Aug. 3, 1940
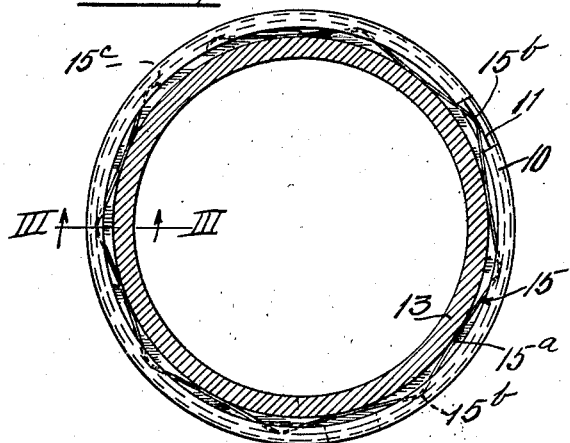
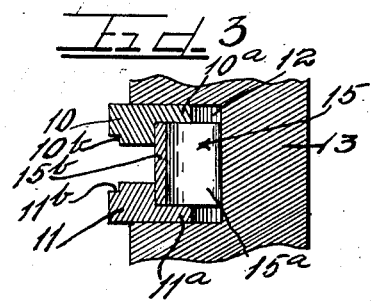
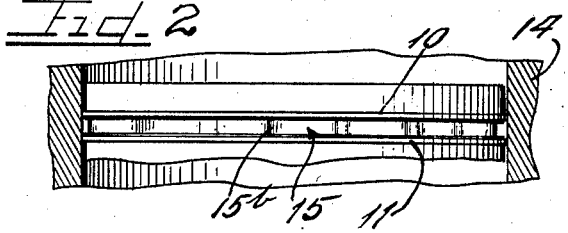
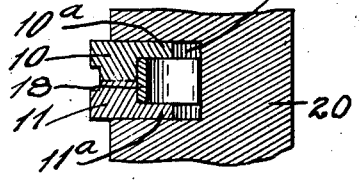
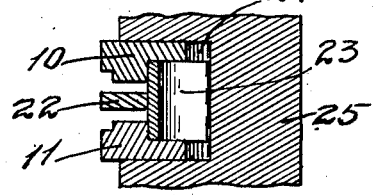
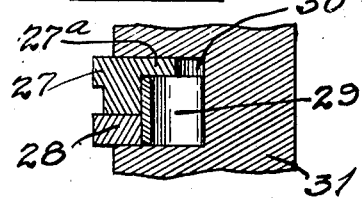
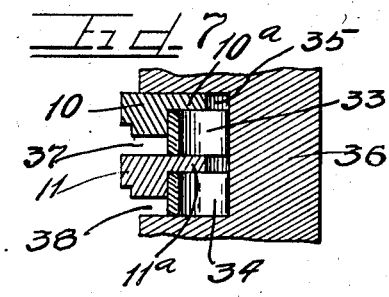
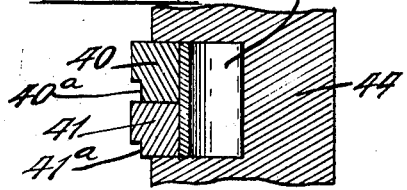
Inventor
Albert P. Fall.

Patented May 30, 1944

2,349,903

UNITED STATES PATENT OFFICE 2,349,903

PISTON RING ASSEMBLY

Albert P. Fall, Toledo, Ohio

Application August 3, 1940, Serial No. 350,229

3 Claims. (Cl. 309—45)

This invention relates to piston rings, that is, metallic expansive rings located in grooves in a piston for preventing the leakage of gas past the piston, and particularly to piston rings for internal combustion engines in which the piston rings not only serve to prevent leakage of gas past the pistons but also serves to control the amount of oil on the cylinder walls.

One of the principal objects of the present invention is to provide a piston ring having narrow cylinder wall engaging surfaces which will quickly wear into a perfect fit with the cylinder wall, even if the cylinder wall is worn and slightly irregular.

Another object of the present invention is to provide a piston ring which will tend to support the upper end of the piston coaxially with the cylinder and thus lessen piston slap and oil pumping in an engine in which the pistons and cylinders are somewhat worn.

Another object of this invention is to provide a composite piston ring engaging the cylinder wall along two or more lines extending around the cylinder and having spring means acting between the cylinder engaging portion of the ring and the piston.

Other objects and features will appear from the following description and the appended claims taken in connection with the accompanying drawing, in which:

Figure 1 is a horizontal section through a piston showing one of the preferred forms of the invention in place;

Figure 2 is a side elevation of the embodiment of the invention shown in Figure 1 mounted on a piston in a cylinder, the cylinder being shown in section.

Figure 3 is a cross section on the line III—III of Figure 1 looking in the direction of the arrows and on an enlarged scale;

Figure 4 is a cross section similar to Figure 3 showing a second form of the invention;

Figure 5 is a cross section similar to Figure 3 showing a third form of the invention;

Figure 6 is a cross section similar to Figure 3 showing a fourth form of the invention;

Figure 7 is a cross section similar to Figure 3 showing a fifth form of the invention; and Figure 8 is a cross section similar to Figure 3 showing a sixth form of the invention.

The form of the invention shown in Figures 1 to 3 comprises a pair of split rings or segments 10 and 11 formed of some suitable material, such as a high quality cast iron, and having the cross sections shown in Figure 3. As may be seen from Figure 3, the cross sections of the two segments 10 and 11 are similar, one segment 11 being like the other segment 10 but inverted. The segment 10 comprises a main portion adapted to lie against one side of the groove 12 in the piston 13, and is formed with an integral flange 10a extending radially inwardly against the side of the groove 12. The outer face of the ring or segment 10 is formed with a set-back or marginal groove 10b, so that the width of the face of the ring that bears against the wall of the cylinder 14 is considerably narrower than the main portion of the ring 10. The ring 11 is similarly formed with an axially inwardly projecting flange 11a lying against the bottom side of the ring groove 12 and with an offset or groove 11b.

The two rings or segments 10 and 11 are held against the sides of the groove 12 and are pressed resiliently outward against the cylinder wall 14 by means of a spring steel expander ring 15. The expander ring 15 lies between the flanges 10a and 11a on the ring segments 10 and 11, as shown in Figure 3, and thus holds the segments 10 and 11 against the upper and lower sides of the piston ring groove 12. The expander ring 15, is not circular in plan but is approximately polygonal, as shown in Figure 1, the sides 15a of the polygon being concave and bearing against the bottom of the groove 12 and the corners 15b of the polygon being rounded and bearing against the back of the main portions of the ring segments 10 and 11. The ring 15 is split at 15c in order that it may expand or contract as required by the ring segments 10 and 11 and the cylinder 14 in which the piston ring assembly is being used. It may be noted from Figure 1 that the concave or relatively straight portions 15a of the expander ring 15 bear against the bottom of the groove 12 and that the corners 15b bear against the ring segments 10 and 11, thus pressing the ring segments 10 and 11 radially outwardly with respect to the piston 13. With this arrangement, the exact pressure that may be desired between the ring segments 10 and 11 and the cylinder wall 14 may be secured, and this pressure will be uniformly distributed around the entire circumference of the ring segments.

It will be noted that the construction shown in Figure 3 provides a slot between the ring segments 10 and 11. At the points where the corners 15b of the expander ring press against the ring segments 10 and 11, this slot is closed, but it may readily be seen from Figure 1 that the concave portions 15a of the expander ring lie in back of the ring segments 10 and 11 thus leaving the back of the slot open at these points. This permits the piston ring assembly to act as an oil control ring, the oil being scraped off the cylinder wall by the ring segments 10 and 11 and escaping through the slot between them and through suitable oil drain holes drilled in the piston 13 in the conventional manner.

The form of the invention shown in Figure 4 is intended to function purely as a compression ring and comprises two ring segments 10 and 11, which may be identical with the ring segments in the form of the invention shown in Figures 1, 2 and 3, and a spring steel expander ring 18. The expander ring 18 is similar to the expander ring 15 in the form of the invention shown in Figures 1, 2 and 3 but is considerably narrower. The width of the expander ring 18 is such that it fits between the flanges 10a and 11a of the ring segments 10 and 11 when the main portions of the ring segments 10 and 11 are in contact, as shown in Figure 4, and the piston ring groove 19 in the piston 20 is of such a width as to accommodate the ring segments 10 and 11 in this relation. It will be noted that, in the construction shown in Figure 4, there is no slot between the ring segments 10 and 11 and that the ring assembly therefore will not remove oil from the cylinder wall to any appreciable extent. If it is desired to remove oil at this point, however, a slot may be provided.

The form of the invention shown in Figure 5 comprises a pair of ring segments 10 and 11, which may be identical with the ring segments 10 and 11 in the form of the invention shown in Figures 1, 2 and 3, a floating ring segment 22, and a spring steel expander ring 23. The expander ring 23 is similar to the expander ring 15 in the first form of the invention but is wider so that the slot between the two ring segments 10 and 11 is relatively wide, thus providing room between the ring segments 10 and 11 for the floating ring segment 22. The groove 24 in the piston 25 is, of course, wider than the groove 12 employed for the first form of the invention in order to accommodate the wider ring assembly.

The floating ring segment 22 may be of cast iron or steel and is of simple rectangular cross section. The ring segment 22 is split in the same manner as the ring segments 10 and 11 and is pressed against the cylinder wall by the spring expander ring 23 in the same way as the upper and lower ring segments 10 and 11. When the engine in which the ring assembly is used is in operation, the floating ring segment 22 moves up and down in the slot between the upper and lower ring segments 10 and 11 and prevents the accumulation of any carbon or other undesirable material between the upper and lower ring segments, so that they will always be free to expand and contract as required by the cylinder bore. Keeping the slot between the rings 10 and 11 clear is also of importance because of the oil control function of the ring assembly shown in Figure 5. Obviously, if this slot were to become clogged by carbon, the oil control properties of the ring assembly would be greatly impaired.

The form of the invention shown in Figure 6 comprises upper and lower ring segments 27 and 28 and a spring steel expander ring 29 located within a piston ring groove 30 in a piston 31. The upper ring segment 27 may be identical with either of the ring segments 10 and 11 in the form of the invention shown in Figures 1, 2 and 3 or it may have slightly different proportions, as shown. In any case, the ring segment 27 is provided with a radially inwardly projecting lip 27a integral with the main portion of the ring segment and lying against one side of the ring groove 30.

The lower ring segment 28 may be formed of cast iron but is preferably formed of alloy steel and has a plain rectangular cross section, as shown, the width of the ring segment 28 being such that, with the upper ring segment 27, it fills the width of the ring groove 30. The spring steel expander ring 29 is generally similar to the expander ring 15 employed in the first form of the invention, its width being such as to allow it to fit between the flange 27a on the upper ring segment 27 and the lower side of the ring groove 30.

The form of the invention shown in Figure 7 comprises two ring segments 10 and 11, which are identical with the ring segments 10 and 11 in the form of the invention shown in Figures 1, 2 and 3, and two spring steel expander rings 33 and 34, all fitting within a single ring groove 35 in a piston 36. This construction differs from the one shown in Figures 1, 2 and 3 chiefly in that both of the ring segments 10 and 11 have the same side up and in the use of two expander rings 33 and 34 instead of a single expander ring. The flange 10a on the upper ring segment 10 lies flat against the upper side of the ring groove 35 but the flange 11a of the lower ring segment 11 lies between the two expander rings 33 and 34 instead of lying against the bottom of the ring groove.

The two expander rings 33 and 34 and the ring groove 35 are of such widths that the ring segments 10 and 11 are spaced from each other and from the bottom of the ring groove 35, thus providing two oil control slots 37 and 38. This form of the invention therefore is very effective in preventing excessive oil consumption.

The form of the invention shown in Figure 8 comprises a pair of ring segments 40 and 41 which are identical with each other and are of such a width that together they fill the width of the ring groove in the piston 44. The faces of both of the ring segments 40 and 41 are set back near their lower edges, as shown at 40a and 41a, so that the width of the face which bears against the cylinder wall is substantially narrower than the over-all width of the ring segments. The two ring segments 40 and 41 are pressed outwardly against the cylinder wall by means of a spring steel expander ring 42, which is similar in plan to the expander ring 15 shown in Figure 1 but whose width is equal to the width of the ring groove.

The various forms of ring assemblies shown in the drawings and described above may be used in various combinations with each other and with conventional piston rings. For example, in a piston having three ring grooves, the upper ring may be a plain compression ring of rectangular cross section, the second ring may be a compression ring of the type shown in Figure 6, and the third ring may be an oil ring of the type shown in Figures 1, 2 and 3. In a piston having four ring grooves, the same arrangement of rings may be used in the first three grooves and a conventional one-piece oil ring used in the fourth groove. Another arrangement which is satisfactory for three ring pistons is to provide a dual compression ring of the type shown in Figure 8 in the first ring groove, a compression ring of the type shown in Figure 4 in the second ring groove, and an oil control ring of either the type shown in Figures 1, 2, and 3 or in Figure 5 in the third ring groove. These are only a few of the possible combinations which may be advantageously employed, and it will be obvious that numerous other possible combinations may be made and will perform effectively.

While I have shown and described only a few of the principal forms of my invention, it is to be clearly understood that these are shown only by way of example and that my invention is not limited thereto but includes everything coming clearly within the terms of the following claims.

I claim as my invention:

1. A piston ring assembly comprising ring segments, said ring segments including upper and lower members having radially inwardly extending flanges and axially extending shoulder flanges, each of said shoulder flanges having an outer recessed edge providing a cylinder engaging surface of less width than the axial width of the member, a radially expansive spring expander seated between said radially extending flanges and against said axially extending shoulder flanges, and a floating ring segment between said upper and lower members seated against said spring expander and extending radially outward thereof to terminate flush with the cylinder engaging surfaces on said ring segments, said ring assembly being adapted to slidingly fit within a piston ring groove with the spring expander pressing against the bottom of the groove and against the ring segment members and the floating ring to hold them against the wall of a cylinder.

2. A piston ring assembly comprising a pair of spaced opposed ring segments, each of said segments having an axially extending main portion and a radially inwardly extending flange, the intersecting surfaces of said main portion and said flange on each of said segments extending in right angular relation, a spring expander ring between said flanges having unbroken parallel surfaces for maintaining said segments in spaced relation against the sides of a piston groove, said expander ring being seated against said right angular intersecting surfaces, and a floating ring embracing said expander ring between said segments and being coextensive radially outward with said segments, said segments, floating ring and expander being adapted to fit within a ring groove of a piston with said expander pressing against the bottom of the groove for urging said segments and floating ring against the wall of a cylinder containing said piston.

3. A piston ring structure including spaced opposed ring segments each having an expander abutment shoulder spaced radially inward from its outer periphery and spaced axially inward from its outer end surface, an expander thrusting against said shoulders and holding the segments in axial alignment and in axial spaced relation, and a floating ring enveloping the expander between the ring segments and extending radially outward from the expander to terminate flush with the outer peripheries of the segments.

ALBERT P. FALL.